(12) United States Patent
Son et al.

(10) Patent No.: US 12,454,206 B2
(45) Date of Patent: Oct. 28, 2025

(54) MOTOR DRIVEN CHILD SEAT FOR VEHICLE

(71) Applicants: Hyundai Motor Company, Seoul (KR); Kia Corporation, Seoul (KR); Poled Co., Ltd., Chungcheongnam-do (KR)

(72) Inventors: Byeong Seon Son, Seoul (KR); Tae Hoon Lee, Gyeonggi-do (KR); Seung Hyun Kim, Daejeon (KR); Ji Hwan Kim, Seoul (KR); Seon Chae Na, Gyeonggi-do (KR); Sang Ho Kim, Incheon (KR); Sang Hoon Park, Incheon (KR); Jeong In Baek, Gyeonggi-do (KR); Yong Chul Jang, Gyeonggi-do (KR); In Ju Lee, Gyeonggi-do (KR)

(73) Assignees: Hyundai Motor Company, Seoul (KR); Kia Corporation, Seoul (KR); Poled Co., Ltd., Chungcheongnam-Do (KR)

( * ) Notice: Subject to any disclaimer, the term of this patent is extended or adjusted under 35 U.S.C. 154(b) by 293 days.

(21) Appl. No.: 18/080,541

(22) Filed: Dec. 13, 2022

(65) Prior Publication Data
US 2023/0356633 A1    Nov. 9, 2023

(30) Foreign Application Priority Data

May 3, 2022  (KR) ........................ 10-2022-0054526

(51) Int. Cl.
*B60N 2/28*    (2006.01)

(52) U.S. Cl.
CPC ................................. *B60N 2/2869* (2013.01)

(58) Field of Classification Search
CPC ............................ B60N 2/2869; B60N 2/2875
See application file for complete search history.

(56) References Cited

U.S. PATENT DOCUMENTS

| | | | | |
|---|---|---|---|---|
| 7,073,859 | B1* | 7/2006 | Wilson | B60N 2/2863 |
| | | | | 297/256.13 |
| 8,033,605 | B2* | 10/2011 | Miura | B60N 2/2893 |
| | | | | 297/344.14 |
| 8,220,856 | B2* | 7/2012 | Horiguchi | B60N 2/0224 |
| | | | | 296/65.01 |
| 8,651,572 | B2* | 2/2014 | Medeiros | A47D 1/0081 |
| | | | | 297/256.13 |
| 10,449,876 | B2* | 10/2019 | Lonstein | A47D 1/006 |
| 10,688,892 | B2* | 6/2020 | Anderson | B60N 2/2821 |
| 11,260,779 | B2* | 3/2022 | Brunick | B60N 2/2875 |
| 11,345,258 | B2* | 5/2022 | Haller | B60N 2/067 |
| 11,878,609 | B2* | 1/2024 | Williams | B60N 2/2845 |
| 2007/0222267 | A1* | 9/2007 | Tsujimoto | F16H 37/126 |
| | | | | 297/344.24 |
| 2016/0304004 | A1* | 10/2016 | Sandbothe | B60N 2/286 |
| 2019/0077282 | A1* | 3/2019 | Reaves | B60N 2/2872 |
| 2022/0355713 | A1* | 11/2022 | Longenecker | B60N 2/2851 |

\* cited by examiner

*Primary Examiner* — Philip F Gabler
(74) *Attorney, Agent, or Firm* — Fox Rothschild LLP (57) ABSTRACT

The present disclosure provides a motor-driven child seat for a vehicle capable of making it more convenient to sit a child in the child seat and to switch the seat to a comfortable posture by enabling swiveling adjustment of the child seat using the swivel-driving device and reclining adjustment of the child seat using the reclining-driving device.

19 Claims, 10 Drawing Sheets

MOTOR DRIVEN CHILD SEAT FOR VEHICLE

CROSS-REFERENCE TO RELATED APPLICATION

This application claims under 35 U.S.C. § 119(a) the benefit of Korean Patent Application No. 10-2022-0054526, filed on May 3, 2022, the entire contents of which are incorporated herein by reference.

BACKGROUND

Technical Field

The present disclosure relates to a motor-driven child seat for a vehicle. More particularly, it relates to a motor-driven child seat for a vehicle capable of adjusting reclining and swiveling of the child seat.

Background

Generally, because it is legislated that a child seat for a vehicle must be installed for a child (e.g., less than 6 years old) to ride in a vehicle, child seats are rapidly spreading.

However, because a conventional child seat has a structure that makes it difficult to adjust the seat position, it is inconvenient for adults to sit a child in the child seat while holding the child, and the child may refuse to sit or may feel uncomfortable when sitting in the child seat.

For example, since the child seat is mounted on the rear seat of the vehicle in a fixed state facing the front of the vehicle, an adult has to bend over while holding the child so as to sit the child in the child seat, and has to sit the child in the correct position in the child seat while correcting the child's posture to face the front of the vehicle, so it is inconvenient from an adult's point of view.

In addition, even in the case of a conventional child seat having a manual swivel function, it is inconvenient to manually adjust the child seat while an adult is holding a child, and it is also uncomfortable to sit a child in the child seat.

Moreover, when the adult wants to change the posture of the child to a more comfortable one while driving the vehicle, considering that the child sitting in the conventional child seat sleeping or staying in one position might feel discomfort, it is inconvenient because the adult, who is the driver, has to first pull over the vehicle and then move to the rear seat in order to change the posture of the child.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a motor-driven child seat for a vehicle capable of making it convenient to sit in a child in the child seat and to switch the seat to a comfortable posture by enabling swiveling adjustment of the child seat using a swivel-driving device and reclining adjustment of the child seat using a reclining-driving device.

In one embodiment, the present disclosure provides a motor-driven child seat for a vehicle, the seat including a base plate having a structure to be seated on a vehicle seat, a swivel-driving device mounted on the base plate, a swivel bracket rotatably connected to the swivel-driving device, a swivel plate integrally connected to the swivel bracket and rotatably disposed on the base plate, a reclining support bracket mounted on each of opposite sides of the swivel plate, a reclining frame mounted to a skeletal frame of the child seat while being reclinably connected to the reclining support bracket, and a reclining-driving device mounted over the reclining support bracket and the reclining frame so as to recline the reclining frame.

In a preferred embodiment, the base plate may have an upper plate having formed therein a seating groove, in which the swivel plate, having a circular shape, is rotatably seated.

In another preferred embodiment, the swivel plate may have mounted thereon a guide pin, and the seating groove may have a bottom having formed therein a guide groove into which the guide pin is slidably inserted.

In still another preferred embodiment, the base plate may have a lower plate having mounted thereon an escape prevention bracket bent towards an upper surface of the swivel plate, and the escape prevention bracket may have a bottom surface at the distal end thereof, the bottom surface being integrally formed with a gap prevention protrusion coming into close contact with the upper surface of the swivel plate.

In some embodiments, the bottom surface may be integrally formed with a gap prevention protrusion coming into close contact with the upper surface of the swivel plate.

In yet another preferred embodiment, the swivel-driving device may include a swivel motor mounted on the lower plate of the base plate, a driving gear mounted on the output shaft of the swivel motor, a drum fastened to the central portion of the swivel bracket, and a swivel gear formed at the lower portion of the drum and meshing with the driving gear.

In still yet another preferred embodiment, the lower plate of the base plate may additionally have mounted thereon a first motor-mounting bracket, configured to fix the swivel motor while the driving gear protrudes upwards.

In some embodiments, the edge portions of the lower plate and the upper plate may be fastened to each other so as to form an internal space.

In a further preferred embodiment, the first motor-mounting bracket may have an upper portion having additionally mounted thereon a driving gear protection bracket, configured to rotatably support the upper end portion of the driving gear.

In another further preferred embodiment, the reclining-driving device may include a reclining motor mounted to the swivel bracket by a second motor-mounting bracket, a decelerator mounted on the reclining support bracket and connected to the output shaft of the reclining motor, and a rack gear mounted on the reclining frame and meshed with the output gear of the decelerator.

In still another further preferred embodiment, the reclining frame may have formed therein a slot configured to guide the direction of reclining movement, and the reclining support bracket may have mounted thereon a slide pin slidably inserted in the slot.

In yet another further preferred embodiment, the decelerator may include a support frame, mounted to be spaced apart from the inner surface of the reclining support bracket, and a reduction gear train, mounted between the reclining support bracket and the support frame so as to transmit rotational power between the input gear connected to the output shaft of the reclining motor and the output gear meshed with the rack gear.

In some embodiments, when the swivel plate rotates, the reclining support bracket, and the reclining frame, and the skeletal frame of the seat may all rotate together in the same direction, thereby allowing swiveling of the seat.

In some embodiments, when the reclining frame reclines, the slide pin may slide along the slot formed in the reclining frame to guide the reclining frame in a reclining direction, thereby allowing the reclining frame and the skeletal frame to be stably reclined along a constant reclining trajectory.

In an embodiment, a vehicle comprising the seat may be provided. The seat may be mounted on a rear seat of the vehicle in a fixed state facing the front of the vehicle.

Other embodiments and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Hereinafter, preferred embodiments of the present disclosure will be described with reference to the accompanying drawings.

FIGS. 1, 2A, 2B, 3A, and 3B are perspective views illustrating a motor-driven child seat for a vehicle according to the present disclosure, wherein reference numeral 10 in each drawing indicates a base plate.

The base plate 10 may include a lower plate 11, which is to be seated on a vehicle seat (particularly, a seat cushion of a rear seat), and an upper plate 12 having a hole in the center. Here, the edge portions of the lower plate 11 and the upper plate 12 are fastened to each other so as to form an internal space in which various components are mounted between the lower plate 11 and the upper plate 12.

The base plate 10 may have a swivel plate 20 that has a circular ring shape and may be rotatably seated on the base plate 10. The swivel plate 20 has a swivel bracket 30 integrally formed on the inner diameter of the swivel plate 20.

The upper plate 12 of the base plate 10 may have formed therein a seating groove 13 in which the swivel plate 20 is rotatably seated in the circumferential direction.

Figure 4A:
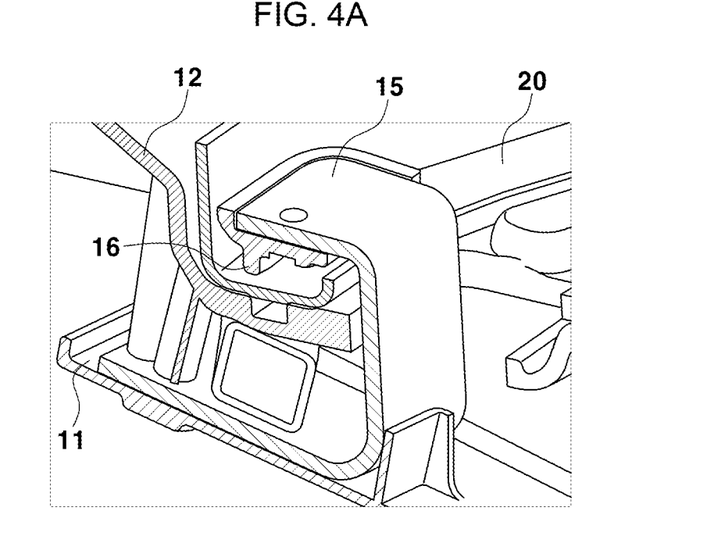
FIGS. 4A and 4B are cross-sectional views illustrating a coupling structure between a rotating swivel plate and a fixed swivel plate of a motor-driven child seat for a vehicle according to the present disclosure.

As illustrated in FIG. 4A, the swivel plate 20 may be provided with a guide pin 21 protruding downwards and mounted at a predetermined position on the swivel plate 20. The upper plate 12 of the base plate 10 has formed therein a seating groove 13. The seating groove 13 has a bottom having formed therein a guide groove 14 into which the guide pin 21 is slidably inserted.

Accordingly, the swivel plate 20 may rotate while moving in the seating groove 13 in the base plate 10, and particularly, the guide pin 21 may slide along the guide groove 14 formed in the bottom of the seating groove 13 when the swivel plate 20 rotates. Therefore, the rotation trajectory of the swivel plate 20 may be kept constant.

Figure 4B:
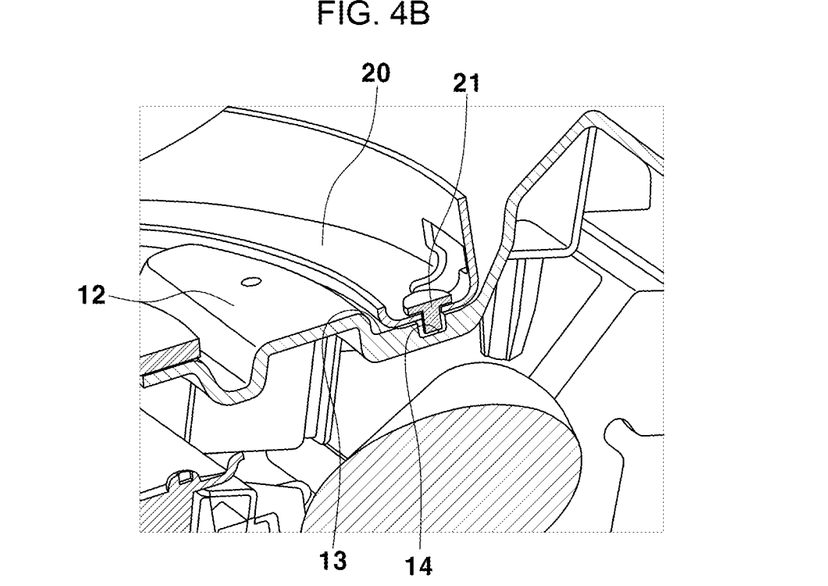

In addition, the lower plate 11 of the base plate 10 may additionally have mounted thereon an escape prevention bracket 15 having a vertically bent shape, as illustrated in FIG. 4B. The distal end of the escape prevention bracket 15 is bent towards the upper surface of the swivel plate 20.

Accordingly, the distal end of the escape prevention bracket 15 may be disposed to almost touch the upper surface of the swivel plate 20 so as to restrict the upward movement of the swivel plate 20, thereby preventing the swivel plate 20 from becoming separated from the base plate 10 in the upward direction and preventing the formation of a gap between the same and the escape prevention bracket 15 in the vertical direction when the swivel plate 20 rotates.

The bottom surface of the distal end of the escape prevention bracket may be integrally formed with a gap prevention protrusion 16, which is to be in close contact with the upper surface of the swivel plate 20.

Accordingly, when the swivel plate 20 is rotated, the gap prevention protrusion 16 of the escape prevention bracket 15 may be supported while in close contact with the upper surface of the swivel plate 20, thereby preventing the formation of a gap between the same and the escape prevention bracket 15 in the vertical direction when the swivel plate 20 rotates and keeping the rotation trajectory of the swivel plate 20 constant.

Meanwhile, the base plate 10 may have mounted thereon a swivel-driving device 40 configured to provide rotational power to the swivel bracket 30, which is mounted on the inner diameter of the swivel plate 20.

The swivel-driving device 40 may include, as illustrated in FIG. 1 and FIGS. 2A to 2C, a swivel motor 41 mounted on the lower plate 11 of the base plate 10, a driving gear 42 mounted on the output shaft of the swivel motor 41, a drum 43 inserted into the central hole in the swivel bracket 30, and a swivel gear 44 formed in the circumferential direction at the lower portion of the drum 43 and meshing with the driving gear 42.

Accordingly, when the driving gear 42 rotates while the swivel motor 41 is driven, the swivel gear 44 meshed with the driving gear 42 may rotate, and the drum 43 formed with the swivel gear 44 may also rotate. Subsequently, while the swivel bracket 30 to which the drum 43 is fastened rotates, the swivel plate 20 to which the swivel bracket 30 is mounted may also rotate.

The rotational force may be stably transmitted to the swivel gear 44 and the drum 43 only when the driving gear 42 rotates within a predetermined trajectory while absorbing vibration when the swivel motor 41 is driven.

To this end, the lower plate 11 of the base plate 10 may have mounted thereon a first motor-mounting bracket 45, configured to fix the swivel motor 41, and the upper portion of the first motor-mounting bracket 45 has mounted thereon a driving gear protection bracket 46.

Here, the first motor-mounting bracket 45, having a structure having a hole through which the driving gear 42 mounted on the output shaft of the swivel motor 41 passes upwards, may be mounted on the lower plate 11 of the base plate 10.

Accordingly, the swivel motor 41 may be seated on the lower plate 11 of the base plate 10 while being positioned at the bottom of the first motor-mounting bracket 45, and the driving gear 42 may be passed through the hole in the first motor-mounting bracket 45 and arranged to protrude upwards. The upper end portion of the driving gear 42 may then be rotatably supported by the driving gear protection bracket 46, and a bolt or the like may be fastened from both ends of the driving gear protection bracket 46 all the way to the body portion of the swivel motor 41 passing through the first motor-mounting bracket 45.

Therefore, the swivel motor 41 may be firmly fixed and may be supported by the first motor-mounting bracket 45, so that vibrations and the like may be absorbed when the swivel motor 41 is driven. In addition, because the upper end portion of the driving gear 42 is rotatably supported by the driving gear protection bracket 46 to thereby allow the driving gear 42 to easily rotate within a predetermined trajectory, the rotational force of the swivel motor 41 and the driving gear 42 may be stably transmitted to the swivel gear 44 and the drum 43.

Meanwhile, the swivel plate 20 may have opposite sides, to each of which a reclining support bracket 22 is mounted, and the reclining support bracket 22 has a reclining frame 70, which is to be mounted to a skeletal frame 80 of the child seat, which is reclinably connected to the reclining support bracket 22.

In addition, a reclining-driving device 50 may be mounted between the reclining support bracket 22 and the reclining frame 70 so as to allow reclining of the reclining frame 70.

Figure 1:
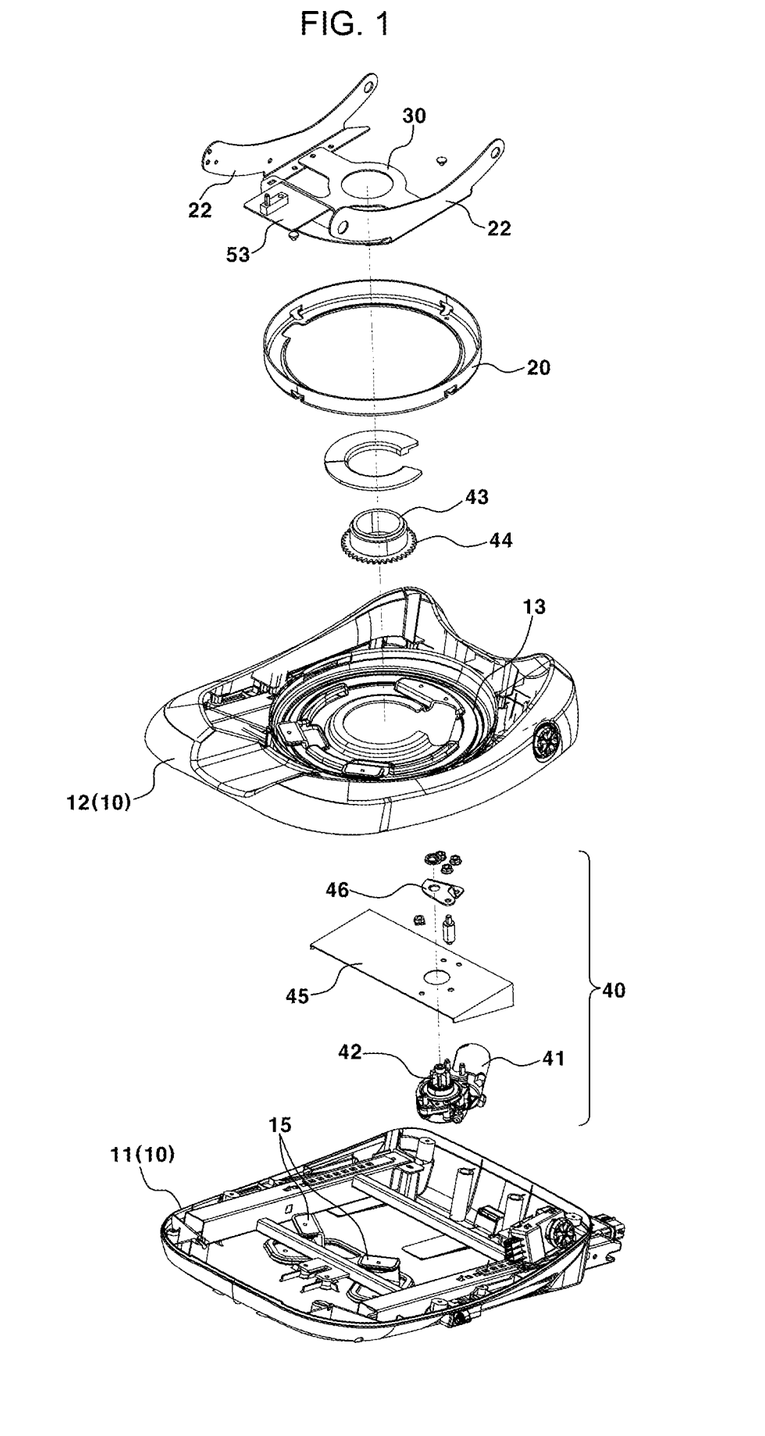
FIG. 1 is an exploded perspective view illustrating a motor-driven child seat for a vehicle according to the present disclosure.
Figure 2A:
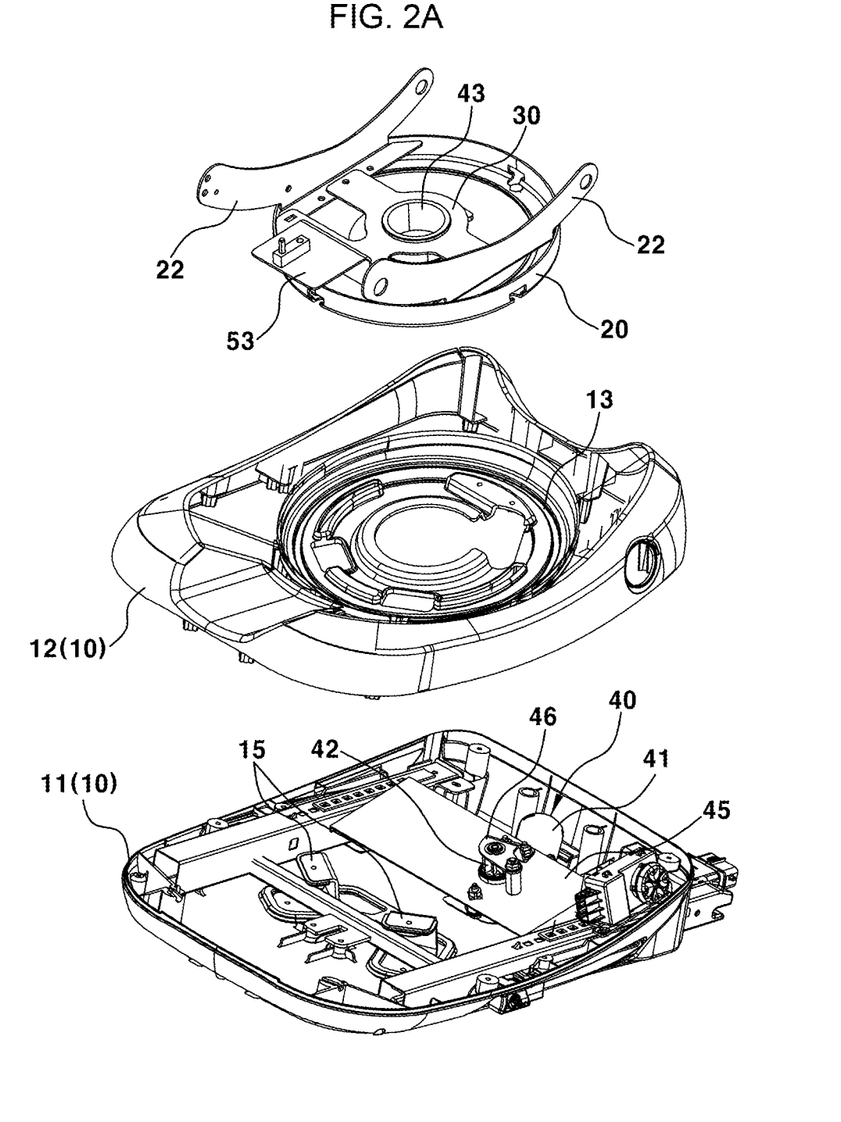
FIGS. 2A and 2B are perspective views illustrating components for adjusting swiveling of a motor-driven child seat for a vehicle according to the present disclosure in an assembled state.
Figure 2B:
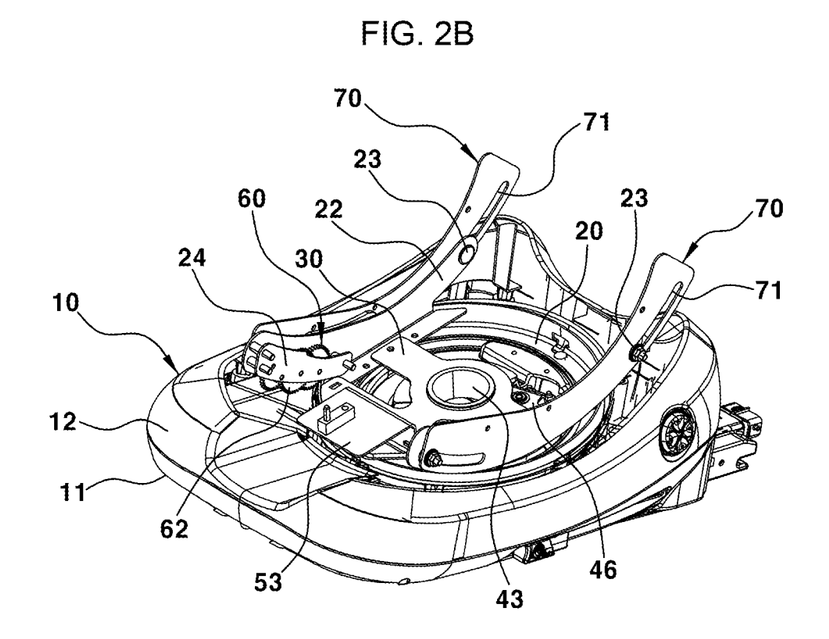
Figure 2C:
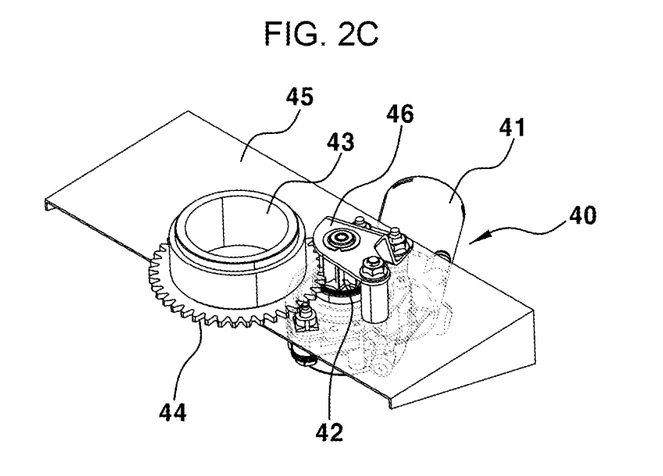
FIG. 2C is a perspective view illustrating only a swivel-driving device of a motor-driven child seat for a vehicle according to the present disclosure.
Figure 3A:
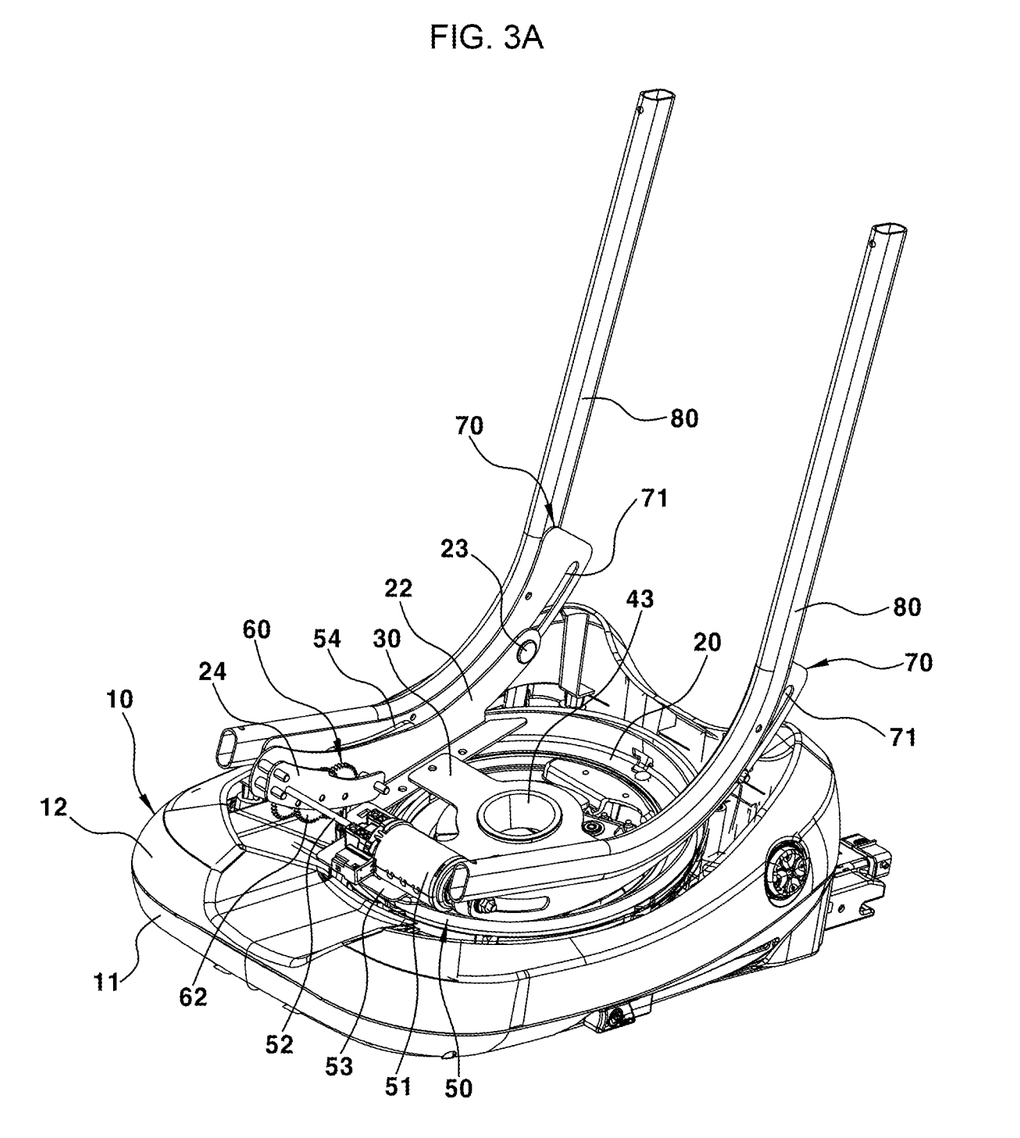
FIGS. 3A and 3B are perspective views illustrating components for adjusting reclining of a motor-driven child seat for a vehicle according to the present disclosure in an assembled state.
Figure 3B:
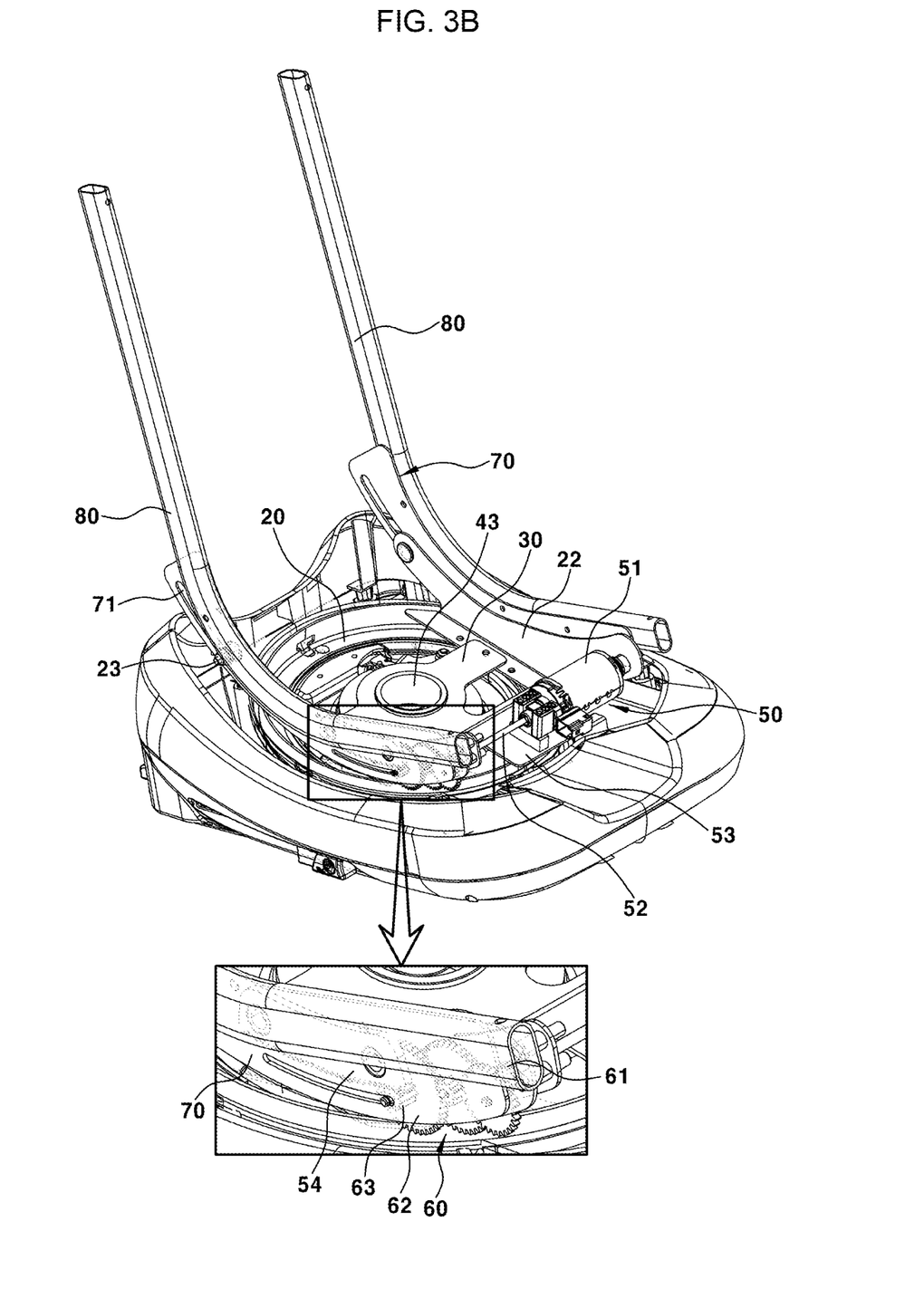

The reclining-driving device 50 may include, as illustrated in FIGS. 3A and 3B, a reclining motor 51 mounted to the front end of the swivel bracket 30 by a second motor-mounting bracket 53, a decelerator 60 mounted on the reclining support bracket 22 and connected to the output shaft 52 of the reclining motor 51, and a rack gear 54 mounted on the reclining frame 70 and meshed with the output gear of the decelerator 60.

In addition, the reclining frame 70 may form therein a slot 71 configured to guide the direction of reclining movement, and the reclining support bracket 22 may have mounted thereon a slide pin 23 slidably inserted in the slot 71.

The decelerator 60 may include a support frame 24 mounted to be spaced apart from the inner surface of the reclining support bracket 22, an input gear 61 connected to the output shaft 52 of the reclining motor 51 and rotatably mounted between the reclining support bracket 22 and the support frame 24, an output gear 63 rotatably mounted on the outer surface of the reclining support bracket 22 and meshed with the rack gear 54, and a reduction gear train 62 rotatably mounted between the reclining support bracket 22 and the support frame 24 so as to reduce the rotational force of the input gear 61 and transmit the same to the output gear 63.

Accordingly, the reclining motor 51 may be driven to rotate the input gear 61, which is connected to the output shaft 52 of the reclining motor 51, and the rotational force of the input gear 61 may be reduced in the reduction gear train 62 and output to the output gear 63. Subsequently, the rotational force of the output gear 63 is transmitted to the rack gear 54, the rack gear 54 moves in the reclining direction, and, at the same time, the reclining frame 70 having mounted thereon the rack gear 54 also moves in the reclining direction, thereby allowing the skeletal frame 80, to which the reclining frame 70 is mounted, and the child seat having the skeletal frame 80 to be reclined.

Here, during the reclining of the reclining frame 70, the slide pin 23 mounted on the reclining support bracket 22 may slide along the slot 71 formed in the reclining frame 70 to guide the reclining frame 70 in the reclining direction, thereby allowing the reclining frame 70 and the skeletal frame 80 to be stably reclined along a constant reclining trajectory.

Figure 5:
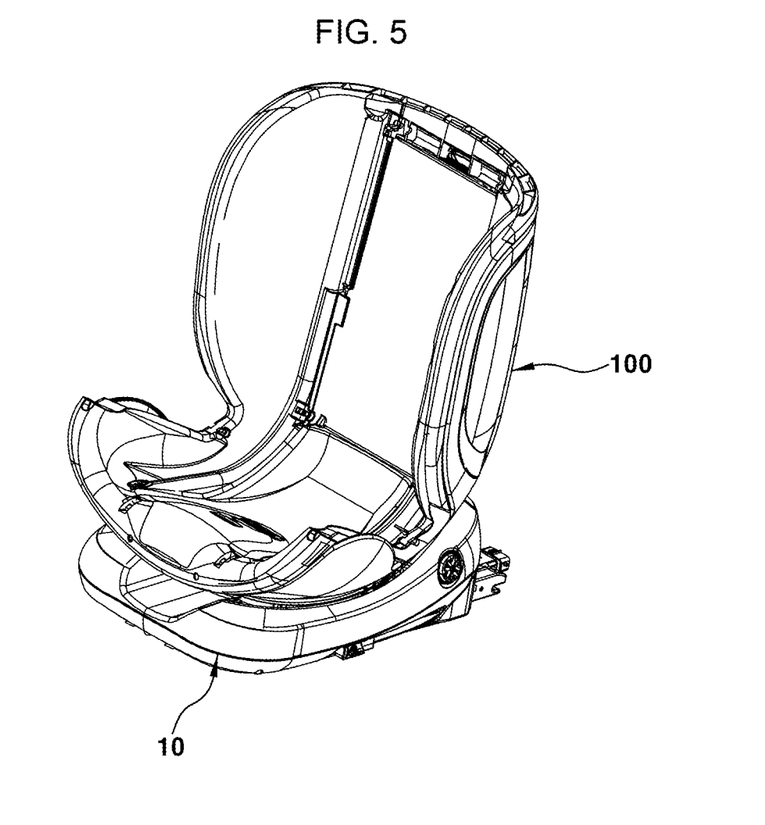
FIG. 5 is a perspective view illustrating the exterior of a motor-driven child seat for a vehicle according to the present disclosure.

Meanwhile, when the assembly of the child seat according to the present disclosure is completed, the child seat 100 having the skeletal frame on the base plate 10 may be seated on the base plate 10 so as to be capable of being reclined and swiveled, as illustrated in FIG. 5.

Here, the operation flow of the motor-driven child seat for a vehicle of the present disclosure having the above-described configuration is as follows.

Swiveling of Child Seat

Figure 6:
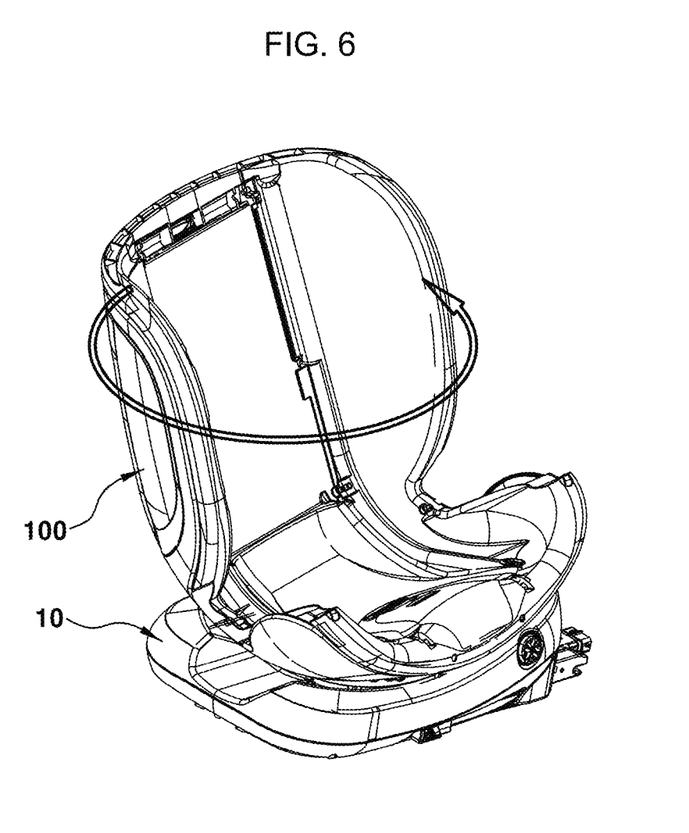
FIG. 6 is a perspective view illustrating the state in which a motor-driven child seat for a vehicle according to the present disclosure is swiveled.

FIG. 5 is a perspective view illustrating the exterior of the motor-driven child seat for a vehicle according to the present disclosure, and FIG. 6 is a perspective view illustrating the state in which the motor-driven child seat for a vehicle according to the present disclosure is swiveled.

When a user operates the swivel operation mode of a switch, which may be mounted on the base plate 10, on the center fascia panel in front of a driver's seat, or on the steering wheel, for swiveling operation of the child seat, power may be supplied to the swivel motor 41.

Accordingly, the driving gear 42 rotates while the swivel motor 41 is driven, the swivel gear 44 meshed with the driving gear 42 rotates, and the drum 43, formed with the swivel gear 44, also rotates.

Subsequently, while the swivel bracket 30 to which the drum 43 is fastened rotates, the swivel plate 20 to which the swivel bracket 30 is mounted may also rotate.

Here, when the swivel plate 20 rotates, the reclining support bracket 22 mounted on each of opposite sides of the swivel plate 20, the reclining frame 70 reclinably connected to the reclining support bracket 22, and the skeletal frame 80 of the child seat to which the reclining frame 70 is mounted may all rotate together in the same direction, thereby allowing swiveling of the child seat.

For example, the child seat 100, facing the front as illustrated in FIG. 5, may be rotated to one side, as illustrated in FIG. 6.

Therefore, the child seat 100 may be rotated in a direction facilitating entry and exit, thereby making it more convenient for a child to sit in or get out of the child seat.

Reclining of Child Seat

Figure 7:
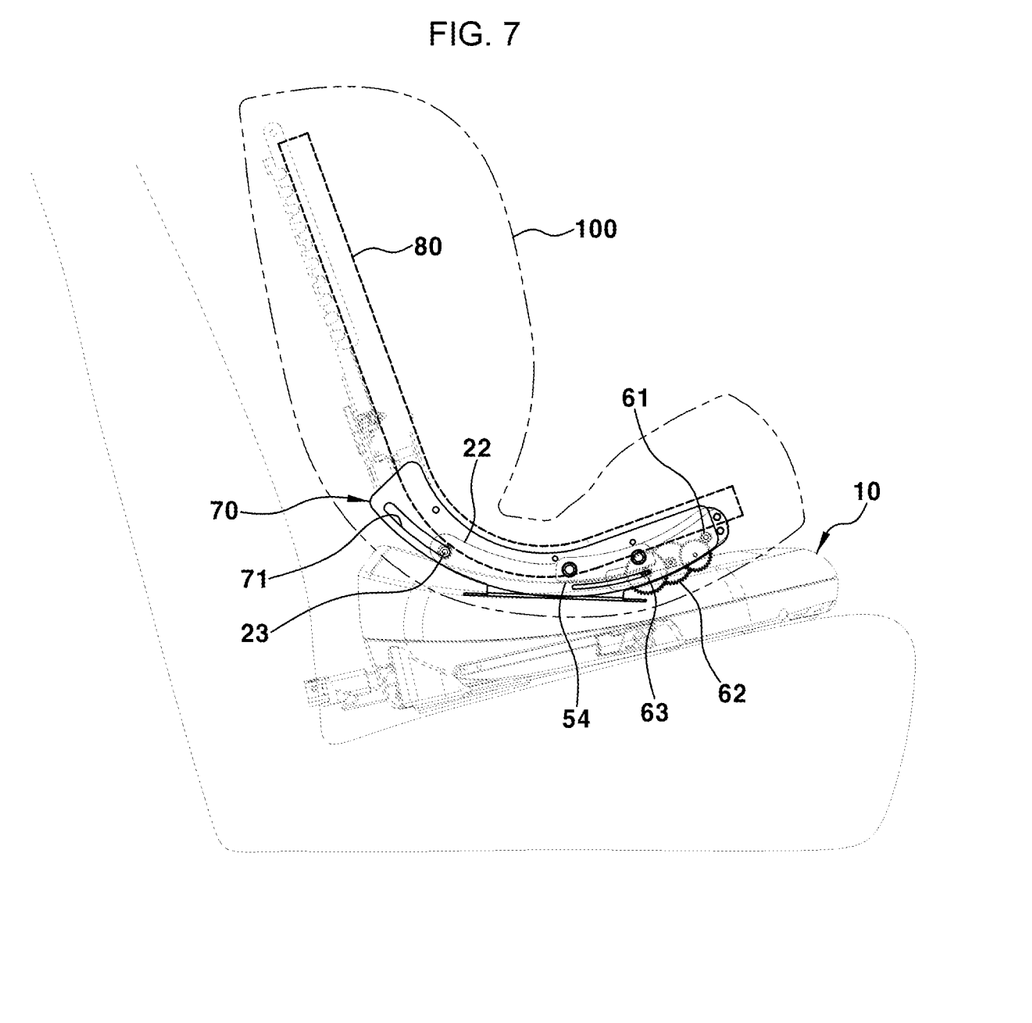
FIG. 7 is a side cross-sectional view illustrating the state before a motor-driven child seat for a vehicle according to the present disclosure is reclined.
Figure 8:
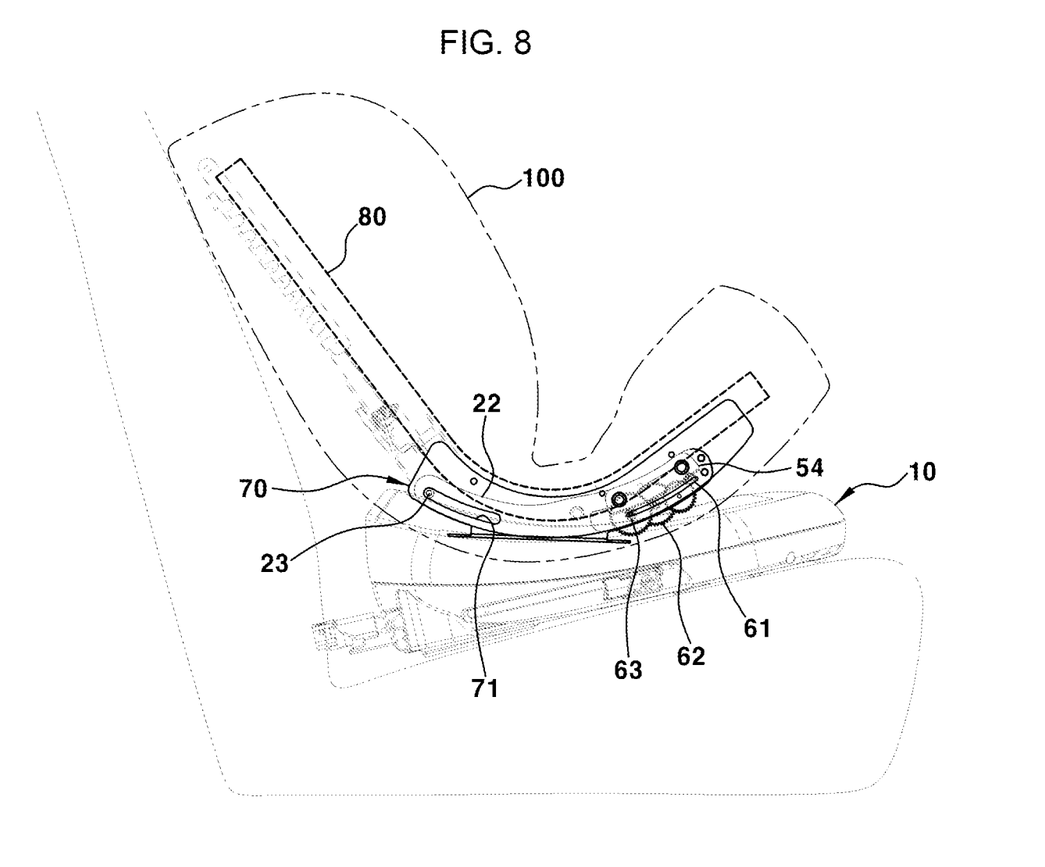
FIG. 8 is a side cross-sectional view illustrating the state after a motor-driven child seat for a vehicle according to the present disclosure is reclined.

FIGS. 7 and 8 are cross-sectional views respectively illustrating the state before and after a motor-driven child seat for a vehicle according to the present disclosure is reclined.

When a user selects the reclining operation mode by manipulating a switch, which may be mounted on the base plate 10, on the center fascia panel in front of the driver's seat, or on the steering wheel, for reclining operation of the child seat, power may be supplied to the reclining motor 51.

Accordingly, the reclining motor 51 may be driven to rotate the input gear 61 connected to the output shaft 52 of the reclining motor 51, and the rotational force of the input gear 61 may be reduced in the reduction gear train 62 and output to the output gear 63.

Subsequently, the rotational force of the output gear 63 may be transmitted to the rack gear 54, the rack gear 54 may move in the reclining direction, and, at the same time, the reclining frame 70, having mounted thereon the rack gear 54, may also move in the reclining direction, thereby allowing the skeletal frame 80, to which the reclining frame 70 is mounted, and the child seat having the skeletal frame 80 to be reclined.

For example, inclination of the skeletal frame 80 of the child seat 100 illustrated in FIG. 7 may be more smoothly adjusted as illustrated in FIG. 8.

Here, during the reclining of the reclining frame 70, the slide pin 23 mounted on the reclining support bracket 22 may slide along the slot 71 formed in the reclining frame 70 to guide the reclining frame 70 in the reclining direction, thereby allowing the reclining frame 70 and the skeletal frame 80 to be stably reclined along a constant reclining trajectory.

Therefore, when a driver wants to change the posture of a child to a more comfortable one, considering that the child seated in the child seat is sleeping or staying in one position, the driver may adjust reclining of the child seat merely by operating the switch while driving the vehicle.

As is apparent from the above description, the present disclosure provides the following effects.

First, swiveling adjustment of the child seat using the swivel-driving device and reclining adjustment of the child seat using the reclining-driving device may be enabled, thereby making it more convenient for a child to sit in the child seat and more convenient to switch the seat to a comfortable posture.

Second, when a driver wants to change the posture of the child to a more comfortable one, considering that the child seated in the child seat is sleeping or staying in one position, the driver may adjust reclining of the child seat merely by operating the switch while driving the vehicle.

Third, the child seat may be rotated in the direction for entry and exit, thereby providing convenience for a child to sit in or get out of the child seat.

Although the present disclosure has been described in detail with reference to one embodiment, the scope of the present disclosure is not limited to the above-described embodiment, and various modifications and improvements by those skilled in the art based on the basic concept of the present disclosure as defined in the claims below will also be included in the scope of the present disclosure.

What is claimed is:

1. A motor-driven child seat for a vehicle, the seat comprising:
    a base plate configured with mounting elements for securing the base plate on a vehicle seat;
    a swivel-driving device mounted on the base plate;
    a swivel bracket rotatably connected to the swivel-driving device;
    a swivel plate integrally connected to the swivel bracket and rotatably disposed on the base plate;
    a reclining support bracket mounted on each of opposite sides of the swivel plate;
    a reclining frame mounted to a skeletal frame of the seat while being reclinably connected to the reclining support bracket;
    a reclining-driving device mounted between the reclining support bracket and the reclining frame so as to recline the reclining frame; and
    a gap prevention protrusion formed on a lower surface of an escape prevention bracket and configured to be in close contact with an upper surface of the swivel plate.

2. The seat according to claim 1, wherein the base plate comprises an upper plate forming therein a seating groove in which the swivel plate having a circular shape is rotatably seated.

3. The seat according to claim 2, wherein a guide pin is mounted to the swivel plate.

4. The seat according to claim 3, wherein the seating groove has a bottom and a guide groove that is formed in the bottom of the seating groove, and into which the guide pin is slidably inserted.

5. The seat according to claim 4, wherein the guide pin protrudes downward.

6. The seat according to claim 2, wherein the base plate comprises a lower plate having the escape prevention bracket mounted thereon and wherein the escape prevention bracket is bent towards the upper surface of the swivel plate.

7. The seat according to claim 6, wherein the escape prevention bracket comprises a bottom surface at a distal end thereof.

8. The seat according to claim 7, wherein the bottom surface is integrally formed with a gap prevention protrusion coming into close contact with the upper surface of the swivel plate.

9. The seat according to claim 6, wherein edge portions of the lower plate and the upper plate are fastened to each other so as to form an internal space.

10. The seat according to claim 1, wherein the reclining-driving device comprises:
   a reclining motor mounted to the swivel bracket by a motor-mounting bracket;
   a decelerator mounted on the reclining support bracket and connected to an output shaft of the reclining motor; and
   a rack gear mounted on the reclining frame and meshed with an output gear of the decelerator.

11. The seat according to claim 10, wherein a slot is formed in the reclining frame and is configured to guide a reclining movement direction.

12. The seat according to claim 11, wherein the reclining support bracket has a slide pin mounted thereon that is slidably inserted in the slot.

13. The seat according to claim 11, wherein when the reclining frame reclines, the slide pin slides along the slot formed in the reclining frame to guide the reclining frame in a reclining direction, thereby allowing the reclining frame and the skeletal frame to be stably reclined along a constant reclining trajectory.

14. The seat according to claim 10, wherein the decelerator comprises:
   a support frame mounted to be spaced apart from an inner surface of the reclining support bracket; and
   a reduction gear train mounted between the reclining support bracket and the support frame so as to transmit rotational power between an input gear connected to the output shaft of the reclining motor and the output gear meshed with the rack gear.

15. The seat according to claim 1, wherein when the swivel plate rotates, the reclining support bracket, and the reclining frame, and the skeletal frame of the seat all rotate together in the same direction, thereby allowing swiveling of the seat.

16. A vehicle comprising the seat according to claim 1.

17. A motor driven child seat for a vehicle, the seat comprising:
   a base plate configured with mounting elements for securing the base plate on a vehicle seat;
   a swivel-driving device mounted on the base plate;
   a swivel bracket rotatably connected to the swivel-driving device;
   a swivel plate integrally connected to the swivel bracket and rotatably disposed on the base plate;
   a reclining support bracket mounted on each of opposite sides of the swivel plate,
   a reclining frame mounted to a skeletal frame of the seat while being reclinably connected to the reclining support bracket,
   a reclining-driving device mounted between the reclining support bracket and the reclining frame so as to recline the reclining frame;
   a swivel motor mounted on a lower plate of the base plate;
   a driving gear mounted on an output shaft of the swivel motor;
   a drum fastened to a central portion of the swivel bracket; and
   a swivel gear formed at a lower portion of the drum and meshing with the driving gear.

18. The seat according to claim 17, wherein the lower plate of the base plate is additionally mounted thereon a first motor-mounting bracket, configured to fix the swivel motor while the driving gear protrudes upwards.

19. The seat according to claim 17, wherein the first motor-mounting bracket comprises an upper portion additionally mounting thereon a driving gear protection bracket, configured to rotatably support an upper end portion of the driving gear.

* * * * *